United States Patent [19]
Witt

[11] Patent Number: 6,094,716
[45] Date of Patent: Jul. 25, 2000

[54] REGISTER RENAMING IN WHICH MOVES ARE ACCOMPLISHED BY SWAPPING RENAME TAGS

[75] Inventor: David B. Witt, Austin, Tex.

[73] Assignee: Advanced Micro Devices, Inc., Sunnyvale, Calif.

[21] Appl. No.: 09/115,115

[22] Filed: Jul. 14, 1998

[51] Int. Cl.[7] ...................................................... G06F 9/38
[52] U.S. Cl. ............................................. 712/23; 712/215
[58] Field of Search ....................................... 712/23, 215

[56] References Cited

U.S. PATENT DOCUMENTS

| | | | |
|---|---|---|---|
| 5,233,696 | 8/1993 | Suzuki | 712/204 |
| 5,345,569 | 9/1994 | Tran | 712/217 |
| 5,574,935 | 11/1996 | Vidwans et al. | 712/23 |
| 5,623,628 | 4/1997 | Brayton et al. | 711/141 |
| 5,632,023 | 5/1997 | White et al. | 712/218 |
| 5,664,215 | 9/1997 | Burgess | 712/23 |
| 5,696,955 | 12/1997 | Goddard et al. | 712/222 |
| 5,768,610 | 6/1998 | Pflum | 712/23 |
| 5,857,089 | 1/1999 | Goddard et al. | 712/222 |
| 5,892,936 | 4/1999 | Tran | 712/216 |
| 5,933,618 | 8/1999 | Tran | 712/217 |
| 5,987,592 | 11/1999 | Mahalingaiah | 712/200 |

FOREIGN PATENT DOCUMENTS

| | | |
|---|---|---|
| 0 518 469 | 12/1992 | European Pat. Off. . |
| 0 851 343 | 7/1998 | European Pat. Off. . |

OTHER PUBLICATIONS

Search Report for International Application No. PCT/US 99/01047 mailed May 14, 1999.

*Primary Examiner*—Eric Coleman
*Attorney, Agent, or Firm*—Conley, Rose & Tayon, P.C.; Lawrence J. Merkel

[57] ABSTRACT

An apparatus for accelerating move operations includes a lookahead unit which detects move instructions prior to the execution of the move instructions (e.g. upon selection of the move operations for dispatch within a processor). Upon detecting a move instruction, the lookahead unit signals a register rename unit, which reassigns the rename register associated with the source register to the destination register. In one particular embodiment, the lookahead unit attempts to accelerate moves from a base pointer register to a stack pointer register (and vice versa). An embodiment of the lookahead unit generates lookahead values for the stack pointer register by maintaining cumulative effects of the increments and decrements of previously dispatched instructions. The cumulative effects of the increments and decrements prior to a particular instruction may be added to a previously generated value of the stack pointer register to generate a lookahead value for that particular instruction. For such an embodiment, reassigning the rename register as described above may thereby provide a valid value for the stack pointer register, and hence may allow for the generation of lookahead stack pointer values for instructions subsequent to the move instruction to proceed prior to execution of the move instruction. The present embodiment of the register rename unit may also assign the destination rename register selected for the move instruction to the source register of the move instruction (i.e. the rename tags for the source and destination are "swapped").

22 Claims, 10 Drawing Sheets

REGISTER RENAMING IN WHICH MOVES ARE ACCOMPLISHED BY SWAPPING RENAME TAGS

BACKGROUND OF THE INVENTION

1. Field of the Invention

This invention is related to the field of processors and, more particularly, to register renaming mechanisms within processors.

2. Description of the Related Art

Superscalar processors attempt to achieve high performance by dispatching and executing multiple instructions per clock cycle, and by operating at the shortest possible clock cycle time consistent with the design. To the extent that a given processor is successful at dispatching and/or executing multiple instructions per clock cycle, high performance may be realized.

One technique often employed by processors to increase the number of instructions which may be executed concurrently is speculative execution (e.g. executing instructions out of order with respect to the order of execution indicated by the program or executing instruction subsequent to predicted branches). Often, instructions which are immediately subsequent to a particular instruction are dependent upon that particular instruction (i.e. the result of the particular instruction is used by the immediately subsequent instructions). Hence, the immediately subsequent instructions may not be executable concurrently with the particular instruction. However, instructions which are further subsequent to the particular instruction in program order may not have any dependency upon the particular instruction and may therefore execute concurrently with the particular instruction. Still further, speculative execution of instruction subsequent to mispredicted branches may increase the number of instructions executed concurrently if the branch is predicted correctly.

Out of order execution gives rise to another type of dependency, often referred to as an "antidependency". Generally, antidependencies occur if an instruction subsequent to a particular instruction updates a register which is either accessed (read) or updated (written) by the particular instruction. The particular instruction must read or write the register prior to the subsequent instruction writing the register for proper operation of the program. Generally, an instruction may have one or more source operands (which are input values to be operated upon by the instructions) which may be stored in memory or in registers. An instruction may also have one or more destinations (which are locations for storing results of executing the instruction) which may also be stored in memory or in registers.

A technique for removing antidependencies between source and destination registers of instructions, and thereby allowing increased out of order execution, is register renaming. In register renaming, a pool of "rename registers" are implemented by the processor. The pool of rename registers are greater in number than the registers defined by the instruction set architecture employed by the processor (the "architected registers"). The destination register for a particular instruction (i.e. the architected register written with the execution result of the instruction) is "renamed" by assigning one of the rename registers to the architected register. The value of the architected register prior to execution of the particular instruction remains stored in the rename register previously assigned to the architected register. If a previous instruction reads the architected register, the previously assigned rename register is read. If a previous instruction writes the architected register, the previously assigned rename register is written. Accordingly, the rename registers may be updated in any order.

Register renaming may also allow speculative update of registers due to instruction execution subsequent to a predicted branch instruction. Previous renames may be maintained until the branch instruction is resolved. If the branch instruction is mispredicted, the previous renames may be used to recover the state of the processor at the mispredicted branch instruction.

While register renaming is useful for removing antidependencies, true dependencies (in which a subsequent instruction uses the result of a particular instruction) cannot be removed using register renaming. If a particular architected register is used repeatedly as a destination register and subsequently as a source register in a code sequence, register renaming may not offer much aid in allowing for concurrent execution of instructions. For example, the x86 instruction set architecture (also referred to as IA-32 or APX) defines a stack pointer register (ESP) which is often used as both a source and as a destination of a variety of instructions. The stack pointer defines the top of a stack maintained in main memory, within which many operands operated upon by instructions are stored. Due to the relatively small number of registers provided in the x86 instruction set architecture, references to the stack and manipulations of the stack are typically fairly frequent. Accordingly, the stack pointer register is often both a source register and a destination register of instructions.

Additionally, a second architected register in the x86 instruction set is the base pointer (EBP) register. The base pointer register is often used to define a memory location within the stack which is the base address for a variety of operands used by a particular program routine. In other words, the operands used by the routine are stored in memory locations between the memory location identified by the base pointer and the memory locations identified by the stack pointer. Accordingly, moves between the base pointer and stack pointer registers may occur frequently in a program (e.g. at the entrance and exit of a variety of subroutines within the program).

A more effective method for increasing concurrency in superscalar processors employing register renaming is therefore desired.

SUMMARY OF THE INVENTION

The problems outlined above are in large part solved by an apparatus for accelerating move operations. The apparatus includes a lookahead unit which detects move instructions prior to the execution of the move instructions (e.g. upon selection of the move operations for dispatch within a processor). Upon detecting a move instruction, the lookahead unit signals a register rename unit, which reassigns the rename register associated with the source register to the destination register. The reassignment may comprise reassigning the rename tag identifying the rename register assigned to the source register to the destination register. If the destination register is a register frequently used as a source for subsequent instructions and the source rename register has already been updated upon detection of the move, concurrency may be increased by reassigning the source register's rename register to the destination register. Once the reassignment is performed, the frequently used register has a valid value if the source rename register was valid prior to the reassignment. Accordingly, subsequent dependent instructions may more rapidly be provided with the value from the frequently used register (i.e. prior to execution of the move operation). Performance of a processor employing the apparatus may be increased due to the enhanced concurrency which may be provided.

In one particular embodiment, the lookahead unit attempts to accelerate moves from a base pointer register to a stack pointer register (and vice versa). The stack pointer register may be frequently used as a source operand (e.g. an address operand), as many instructions may manipulate operands at the top of the stack. Additionally, the base pointer register may often be held constant within a code sequence and be used as a source for addresses within the stack. Therefore, the rename register associated with the base pointer register may frequently be valid upon detection of a move from base pointer to stack pointer. A lookahead value for the stack pointer register may be thereby be provided prior to execution of the move base pointer to stack pointer instruction by reassigning the base pointer rename register to the stack pointer.

Still further, many manipulations of the stack pointer register other than moves may be fixed increments or decrements of the value stored in the stack pointer register. Therefore, an embodiment of the lookahead unit generates lookahead values for the stack pointer register by maintaining cumulative effects of the increments and decrements of previously dispatched instructions. The cumulative effects of the increments and decrements prior to a particular instruction may be added to a previously generated value of the stack pointer register to generate a lookahead value for that particular instruction. For such an embodiment, reassigning the rename register as described above may thereby rapidly achieve a valid value for the stack pointer register, and hence may allow for the generation of lookahead stack pointer values for instructions subsequent to the move instruction to proceed prior to execution of the move instruction.

In addition to assigning the source register's rename register to the destination register upon detection of the move, the present embodiment of the register rename unit assigns the destination rename register selected for the move instruction to the source register of the move instruction (i.e. the rename tags for the source and destination are "swapped"). Upon execution of the move instruction, the source rename register is updated with the value stored in the rename register previously assigned to that source register. Accordingly, the source register is restored to the value stored therein prior to the move instruction and subsequent instructions dependent upon the source register (if any) receive that value.

Broadly speaking, the present invention contemplates an apparatus for performing register renaming comprising a lookahead unit and a rename tags unit. The lookahead unit is configured to scan instructions prior to an assignment of register renames to the instructions. The scan is performed to detect a move instruction having a first architected register as a source register and a second architected register as a destination register. Coupled to the lookahead unit, the rename tags unit is configured to store a plurality of rename tags including a first rename tag corresponding to the first architected register and a second rename tag corresponding to the second architected register. The first rename tag identifies a first rename register assigned to the first architected register and the second rename tag identifies a second rename register assigned to the second architected register. The lookahead unit is configured to signal the rename tags unit upon detecting the move. Responsive to the signal, the rename tags unit is configured to assign the first rename register to the second architected register.

The present invention further contemplates a method for performing register renaming. A first rename register is assigned to a first architected register responsive to dispatching a first instruction having the first architected register as a destination. A second rename register is assigned to a second architected register responsive to dispatching a second instruction having the second architected register as a destination. A move instruction defined to move a value from the first architected register to the second architected register is detected. Responsive to detecting the move, the first rename register is assigned to the second architected register Moreover, the present invention contemplates a processor comprising a rename/schedule unit and a rename register file. The rename/schedule unit is coupled to receive instructions fetched by the processor, wherein the rename/schedule unit is configured to perform register renaming responsive to receiving the instructions. Additionally, the rename/schedule unit is configured to schedule the instructions for execution. Coupled to the rename/schedule unit, wherein the rename register file comprises a plurality of rename registers. The rename/schedule unit is configured to maintain a mapping between each architected register and at least one of the plurality of rename registers. Additionally, upon detecting a move instruction having a first architected register as a source operand and a second architected register as a destination, the rename/schedule unit is configured to reassign one of the plurality of rename registers assigned to the first architected register to the second architected register.

BRIEF DESCRIPTION OF THE DRAWINGS

Other objects and advantages of the invention will become apparent upon reading the following detailed description and upon reference to the accompanying drawings in which.

Figure 1:
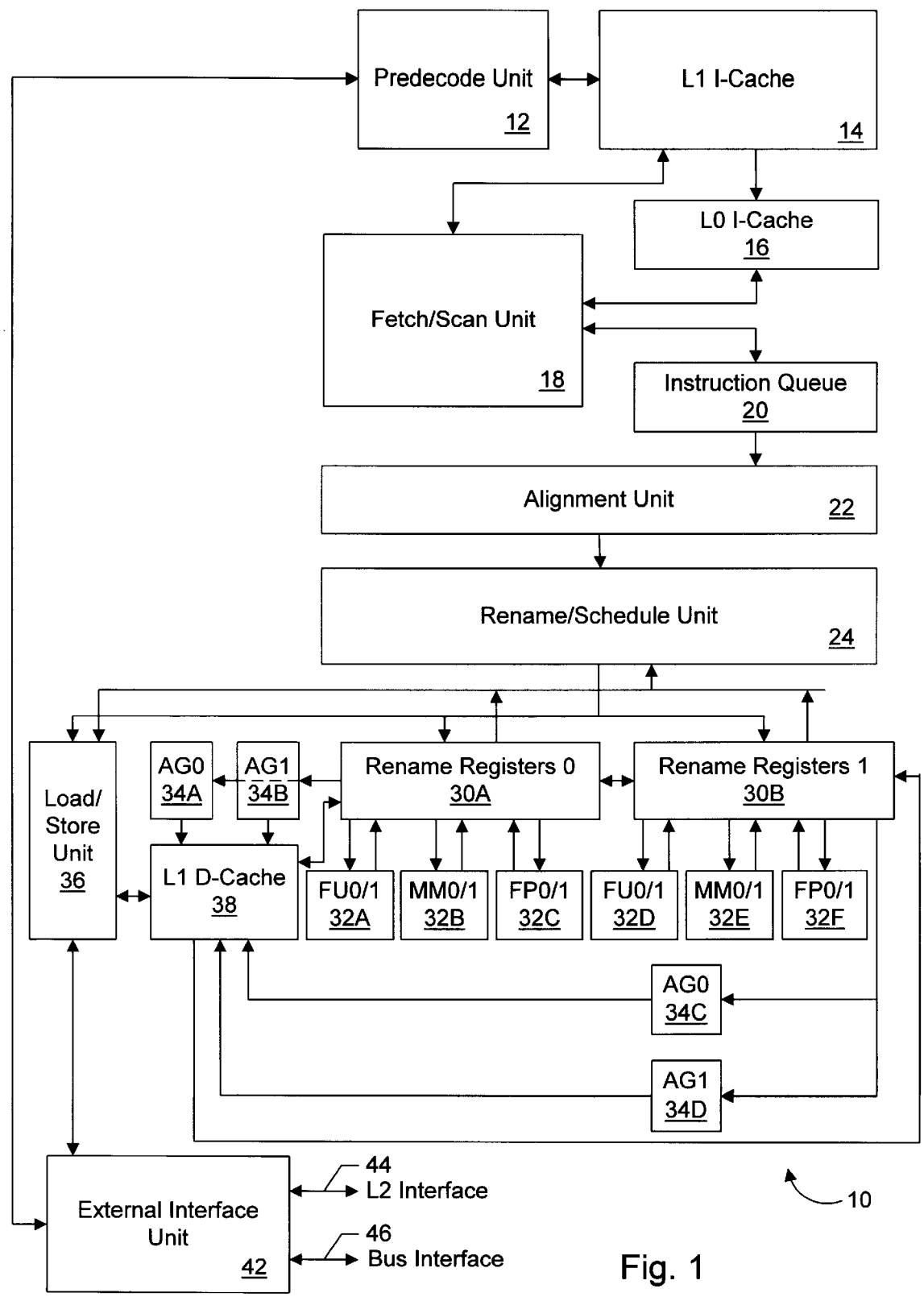
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a rename/schedule unit 24, a first rename register file 30A, a second rename register file 30B, a plurality of functional units 32A, 32B, 32C, 32D, 32E and 32F, a plurality of address generation units 34A, 34B, 34C, and 34D, a load/store unit 36, an L1 D-cache 38, and an external interface unit 42. Elements referred to herein by a particular reference number followed by various letters will be collectively referred to using the reference number alone. For example, functional units 32A–32F will be collectively referred to as functional units 32.

In the embodiment of FIG. 1, external interface unit 42 is coupled to predecode unit 12, load/store unit 36, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 I-cache 16 and to instruction queue 20. Instruction queue 20 is coupled to alignment unit 22, which is further coupled to rename/schedule unit 24. Rename/schedule unit 24 is further coupled to first rename register file 30A, second rename register file 30B, and load/store unit 36. Load/store unit 36 is coupled to L1 D-cache 38. First rename register file 30A is coupled to functional units 32A–32C and to address generation units 34A–34B, as well as to L1 D-Cache 38. Similarly, second rename register file 30B is coupled to functional units 32D–32F and address generation units 34C–34D, as well as to L1 D-Cache 38. Address generation units 34A–34D are coupled to L1 D-Cache 38.

Generally speaking, processor 10 attempts to generate lookahead values for the stack pointer register to remove dependencies which result from the stack pointer register. Many instructions increment or decrement the stack pointer register by a fixed value, or by a value included in the instruction (e.g. an immediate field). Processor 10 calculates the cumulative effects of these manipulations prior to a particular instruction in order to calculate a lookahead value for the stack pointer register which corresponds to that particular instruction. Advantageously, instructions which are dependent upon other instructions only for the value of the stack pointer may be executed in parallel. Certain updates to the stack pointer register may not be discernable by processor 10. Upon detection of such an update, processor 10 may stall subsequent instructions until the indiscernible update has completed. Subsequently, lookahead value generation may be continued.

One type of update to the stack pointer register which is not an increment or decrement of the register and which is frequent in many code sequences is the move base pointer to stack pointer instruction (and vice versa). Generally, a move is a copy of a value from a source location to the destination location. Subsequent to the copy, both the source location and the destination location store the value originally stored in the source location. Processor 10 is configured to accelerate performance of the aforementioned moves in order to reduce the amount of time elapsing before lookahead value generation for the stack pointer register may be continued.

More particularly, when a move from the base pointer register to the stack pointer register is detected, processor 10 signals its register renaming mechanism to swap the rename tags for the base pointer and stack pointer registers (after assignment of a rename register for the destination of the move instruction). If the rename register corresponding to the base pointer register (prior to the move instruction) is valid (i.e. the instruction to which the rename register was assigned as a destination register has executed), then the updated value of the stack pointer register subsequent to the move may be read from the rename register and lookahead value generation for the stack pointer register may continue prior to execution of the move instruction. Since the base pointer register is frequently held constant and used as a base for generating stack addresses prior to the move, often times the value in the rename register may be valid. Advantageously, performance may be increased via acceleration of the move instruction, and of the stack pointer dependent instructions subsequent to the move instruction.

It is noted that the move instruction is still executed within processor 10. However, the rename register assigned to the destination of the move instruction is associated with the source register of the original instruction (since the tags were swapped). Generally, the move instruction is completed by reading the source rename register (which is associated with the destination architected register of the original instruction after the swap) and updating the destination rename register (which is associated with the source architected register of the original instruction after the swap). Subsequent to execution of the move instruction, both rename registers will store the same value. It is further noted that accelerating the move instruction in the manner described herein may be advantageous even in embodiments of processor 10 in which lookahead value generation is not performed. Since the base pointer is often times already valid, instructions subsequent to the move may be scheduled earlier (due to the tag swap, which indicates that the stack pointer register is valid prior to execution of the move). It is still further noted that, for convenience, the term "swapping" of the rename tags will be used herein. Generally, the register rename mechanism may accomplish acceleration of the move instruction by reassigning the source rename register to the destination rename register. In the present embodiment, the rename register assigned for the destination of the move instruction is assigned to the source register (i.e. the tags are swapped) to provide an update to the source register. Other embodiments may provide an updated for the source register in other fashions (e.g., the same rename might be assigned to both the source and destination registers subsequent to the move).

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction. A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses which the bytes within a second cache line are stored. A signed eight bit displacement specifies an address which is +/−128 bytes of the address corresponding to the branch instruction. Accordingly, the number of above and below cache lines which can be reached by a relative branch instruction having an eight bit displacement is limited. The relative cache line portion encodes this limited set of above and below cache lines.

Tables 1 and 2 below illustrates an exemplary encoding of the predecode information corresponding to a byte in accordance with one embodiment of processor 10.

TABLE 1

Predecode Encoding

| Start Bit | Control Transfer Bit | Meaning |
|---|---|---|
| 1 | 0 | Start byte of an instruction which is not a branch. |
| 1 | 1 | Start byte of a branch instruction. |
| 0 | x | Not an instruction boundary. Control Transfer Bit corresponding to displacement is used on 8-bit relative branches to encode target address as shown in Table 2 below. |

TABLE 2

Target Address Encoding

| Control Transfer Bit | Displacement Byte Most Significant Bits (binary) | Meaning |
|---|---|---|
| 0 | 00 | Within Current Cache Line |
| 0 | 01 | One Cache Line Above |
| 0 | 10 | Two Cache Lines Above |
| 1 | 01 | One Cache Line Below |
| 1 | 10 | Two Cache Lines Below |

Note:
Remaining displacement byte bits are the offset within the target cache line. Control Transfer Bit is effectively a direction, and the most significant bits of the displacement byte are the number of cache lines.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. In one embodiment, fetch/scan unit 18 is configured to prefetch the next sequential cache line to a cache line fetched from L0 I-cache 16 during a particular clock cycle unless: (i) a branch misprediction is signalled; (ii) an L0 I-cache miss is detected; or (iii) a target address is generated which is assumed to miss L0 I-cache 16. In one particular embodiment, relative branch instructions employing 32-bit displacements and branch instructions employing indirect target address generation are assumed to miss L0 I-cache 16. For case (i), fetch/scan unit 18 prefetches the cache line sequential to the corrected fetch address. For cases (ii) and (iii), fetch/scan unit 18 prefetches the corresponding miss or target address.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries. Additional details regarding one embodiment of instruction queue 20 are discussed in further detail below.

Alignment unit 22 is configured to route instructions identified by instruction queue 20 to a set of issue positions within rename/schedule unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Rename/schedule unit 24 provides register renaming and instruction scheduling functionality. More particularly, rename/schedule unit 24 provides current rename tags for the source registers of each instruction and assigns rename tags to the destination registers of each instruction. The rename tags identify rename registers within rename registers files 30A–30B.

Additionally, rename/schedule unit 24 may attempt to generate lookahead values for certain types of instructions. Lookahead value generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values. To accelerate the execution of these instructions, rename/schedule unit 24 generates lookahead copies of the ESP register for each of instructions decoded during a clock cycle.

The instructions and assigned renames are stored into a scheduler within rename/schedule unit 24. As source operands for the instructions become available (i.e. are written into rename register files 30A–30B), instructions are scheduled for execution by a particular functional unit 32A–32F.

Rename register files 30A–30B receive instructions from rename/schedule unit 24 upon scheduling of those instructions for execution. Rename register files 30A–30B read the rename registers according to the source rename tags of each instruction, and provide the source values to the functional units 32A–32F or address generation units 34A–34D selected for executing each instruction. Rename register files 30A–30B receive execution results from each functional unit (and load memory operation results from D-Cache 38) along with the rename tag assigned to the destination. Rename register files 30A–30B store the execution results in the identified rename registers. Rename register files 30A–30B comprise a plurality of rename registers. For example, each of rename register files 30A–30B may comprise 100–200 rename registers.

Rename register files 30A–30B are maintained as mirror images. Rename register files 30A–30B are provided instead of a single rename register file to reduce the number of read ports provided upon each register file. The number of write ports may remain the same (since results are propagated from one register file to the other). However, the reduction in read ports may provide substantial savings in implementation (e.g., often the number of read ports is approximately twice the number of write ports). Accordingly, rename register file 30A provides operands to functional units 32A–32C and address generation units 34A–34B, and receives results from functional units 32A–32C and D-Cache 38. Similarly, rename register file 30B provides operands to functional units 32D–32F and address generation units 34C–34D and receives results from functional units 32D–32F and D-Cache 38. Results provided to rename register file 30A are propagated to rename register file 30B and results provide to rename register file 30B are propagated to rename register file 30A. In one embodiment, result propagation to the opposite rename register file occurs with a one clock cycle delay.

In embodiments of processor 10 employing the x86 instruction set, an instruction may include implicit memory operations for address generation units 34 and load/store unit 36 as well as explicit functional operations for functional units 32. Instructions having no memory operand do not include any memory operations, and are handled by functional units 32. Instructions having a source memory operand and a register destination operand include an implicit load memory operation handled by address generation units 34 and load/store unit 36 and an explicit functional operation handled by functional units 32. Instructions having a memory source/destination operand include implicit load and store memory operations handled by address generation units 34 and load/store unit 36 and an explicit functional operation handled by functional units 32. Finally, instructions which do not have an explicit functional operation are handled by load/store unit 36. Each memory operation results in an address generation handled by address generation units 34. Memory operations and instructions (i.e. functional operations) may be referred to herein separately, but may be sourced from a single instruction.

Address generation units 34 are configured to perform address generation operations, thereby generating addresses for memory operations. The generated addresses are forwarded to L1 D-Cache 38 and to load/store unit 36. According to one embodiment, address generation units 34A and 34C are used for load memory operations and address generation units 34B and 34D are used for store memory operations. Functional units 32A and 32D are integer functional units configured to perform integer arithmetic/logical operations and execute branch instructions. Functional units 32B and 32E are multimedia execution units configured to execute multimedia instructions, and functional units 32C and 32F are floating point units configured to execute floating point instructions. In the embodiment shown, each functional unit 32 is configured to execute up to two instructions per clock cycle of the appropriate type. Certain restrictions may apply (e.g. only one integer multiply per clock cycle, one floating point transcendental, etc.)

Load/store unit 36 is configured to interface with L1 D-cache 38 to perform the data storage portion of store memory operations and to handle load/store dependency checking. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified to processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
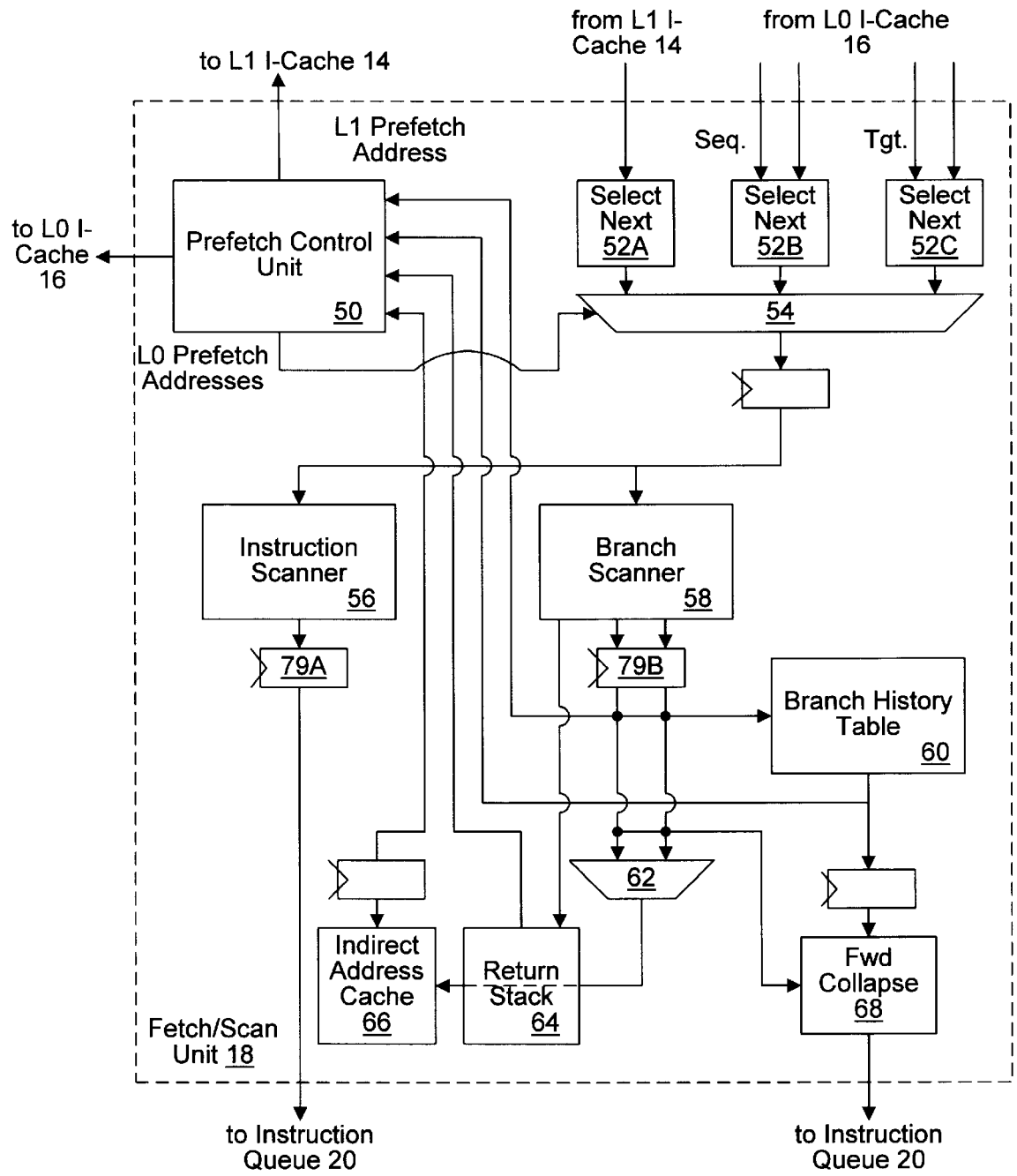
FIG. 2 is a block diagram of one embodiment of a fetch/scan unit shown in FIG. 1.

Turning now to FIG. 2, a block diagram of one embodiment of fetch/scan unit 18 is shown. Other embodiments are possible and contemplated. As shown in FIG. 2, fetch/scan unit 18 includes a prefetch control unit 50, a plurality of select next blocks 52A–52C, an instruction select multiplexor (mux) 54, an instruction scanner 56, a branch scanner 58, a branch history table 60, a branch select mux 62, a return stack 64, an indirect address cache 66, and a forward collapse unit 68. Prefetch control unit 50 is coupled to L1 I-cache 14, L0 I-cache 16, indirect address cache 66, return stack 64, branch history table 60, branch scanner 58, and instruction select mux 54. Select next block 52A is coupled to L1 I-cache 14, while select next blocks 52B–52C are coupled to L0 I-cache 16. Each select next block 52 is coupled to instruction select mux 54, which is further coupled to branch scanner 58 and instruction scanner 56. Instruction scanner 56 is coupled to instruction queue 20. Branch scanner 58 is coupled to branch history table 60, return stack 64, and branch select mux 62. Branch select mux 62 is coupled to indirect address cache 66. Branch history table 60 and branch scanner 58 are coupled to forward collapse unit 68, which is coupled to instruction queue 20.

Prefetch control unit 50 receives branch prediction information (including target addresses and taken/not taken predictions) from branch scanner 58, branch history table 60, return stack 64, and indirect address cache 66. Responsive to the branch prediction information, prefetch control unit 50 generates fetch addresses for L0 I-cache 16 and a prefetch address for L1 I-cache 14. In one embodiment, prefetch control unit 50 generates two fetch addresses for L0 I-cache 16. The first fetch address is selected as the target address corresponding to the first branch instruction identified by branch scanner 58 (if any). The second fetch address is the sequential address to the fetch address selected in the previous clock cycle (i.e. the fetch address corresponding to the run selected by instruction select mux 54).

L0 I-cache 14 provides the cache lines (and predecode information) corresponding to the two fetch addresses, as well as the cache lines (and predecode information) which are sequential to each of those cache lines, to select next blocks 52B–52C. More particularly, select next block 52B receives the sequential cache line corresponding to the sequential address and the next incremental cache line to the sequential cache line. Select next block 52C receives the target cache line corresponding to the target address as well as the cache line sequential to the target cache line. Additionally, select next blocks 52B–52C receive the offset portion of the corresponding fetch address. Select next blocks 52B–52C each select a run of instruction bytes (and corresponding predecode information) from the received cache lines, beginning with the run section including the offset portion of the corresponding fetch address. Since the offset portion of each fetch address can begin anywhere within the cache line, the selected run may included portions of the fetched cache line and the sequential cache line to the fetched cache line. Hence, both the fetched cache line and the sequential cache line are received by select next blocks 52B–52C.

Similarly, select next block 52A receives a prefetched cache line (and corresponding predecode information) from L1 I-cache 14 and selects an instruction run therefrom. Since one cache line is prefetched from L1 I-cache 14, the run selected therefrom may comprise less than a full run if the offset portion of the prefetch address is near the end of the cache line. It is noted that the fetch cache lines from L0 I-cache 16 may be provided in the same clock cycle as the corresponding addresses are generated by prefetch control unit 50, but the prefetch cache line may be a clock cycle delayed due to the larger size and slower access time of L1 I-cache 14. In addition to providing the prefetched cache line to select next block 52A, L1 I-cache 14 provides the prefetched cache line to L0 I-cache 16. If the prefetched cache line is already stored within L0 I-cache 16, L0 I-cache 16 may discard the prefetched cache line. However, if the prefetched cache line is not already stored in L0 I-cache 14, the prefetched cache line is stored into L0 I-cache 16. In this manner, cache lines which may be accessed presently are brought into L0 I-cache 16 for rapid access therefrom. It is noted that, in one particular embodiment, L0 I-Cache 16 is organized as a fully associative cache. Other organizations may be used as desired (e.g. direct mapped, set associative, etc.).

Prefetch control unit 50 selects the instruction run provided by one of select next blocks 52 in response to branch prediction information by controlling instruction select mux 54. As will be explained in more detail below, prefetch control unit 50 receives target addresses from branch scanner 58, return stack 64, and indirect address cache 66 early in the clock cycle as well as at least a portion of the opcode byte of the first branch instruction identified by branch scanner 58. Prefetch control unit 50 decodes the portion of the opcode byte to select the target address to be fetched from L0 I-cache 16 from the various target address sources and provides the selected target address to L0 I-cache 16. In parallel, the sequential address to the fetch address selected in the previous clock cycle (either the target address or the sequential address from the previous clock cycle, depending upon the branch prediction from the previous clock cycle) is calculated and provided to L0 I-cache 16. Branch prediction information (i.e. taken or not taken) is provided by branch history table 60 late in the clock cycle. If the branch instruction corresponding to the target address fetched from L0 I-cache 16 is predicted taken, then prefetch control unit 50 selects the instruction run provided by select next block 52C. On the other hand, if the branch instruction is predicted not taken, then the instruction run selected by select next block 52B is selected. The instruction run provided by select next block 52A is selected if a predicted fetch address missed L0 I-cache 16 in a previous clock cycle and was fetched from L1 I-cache 14. Additionally, the instruction run from L1 I-cache 14 is selected if the instruction run was prefetched responsive to a branch instruction have a 32 bit displacement or indirect target address generation or an L0 I-cache miss was fetched.

The selected instruction run is provided to instruction scanner 56 and branch scanner 58. Instruction scanner 56 scans the predecode information corresponding to the selected instruction run to identify instructions within the instruction run. More particularly in one embodiment, instruction scanner 56 scans the start bits corresponding to each run section in parallel and identifies up to five instructions within each run section. Pointers to the identified instructions (offsets within the run section) are generated. The pointers, instruction bytes, and addresses (one per run section) are conveyed by instruction scanner 56 to instruction queue 20. If a particular run section includes more than five instructions, the information corresponding to run sections subsequent to the particular run section is invalidated and the particular run section and subsequent run sections are rescanned during the next clock cycle.

For embodiments employing microcode, microcode instructions are identified during decode of the instructions (e.g. via the absence of a directly decoded instruction in an issue position to which an instruction was issued).

Branch scanner 58 scans the instruction run in parallel with instruction scanner 56. Branch scanner 58 scans the start bits and control transfer bits of the instruction run to identify the first two branch instructions within the instruction run. As described above, a branch instruction is identified by the control transfer bit corresponding to the start byte of an instruction (as identified by the start bit) being set. Upon locating the first two branch instructions, branch scanner 58 assumes that the instructions are relative branch instructions and selects the corresponding encoded target addresses from the instruction bytes following the start byte of the branch instruction. For embodiments employing the x86 instruction set, a nine bit target address (the displacement byte as well as the corresponding control transfer bit) is selected, and a 32 bit target address is selected as well. Furthermore, at least a portion of the opcode byte identified by the start and control transfer bits is selected. The target addresses and opcode bytes are routed to prefetch control unit 50 for use in selecting a target address for fetching from L0 I-cache 16. The fetch addresses of each branch instruction (determined from the fetch address of the run section including each branch instruction and the position of the branch instruction within the section) are routed to branch history table 60 for selecting a taken/not-taken prediction corresponding to each branch instruction. Furthermore, the fetch addresses corresponding to each branch instruction are routed to branch select mux 62, which is further routed to indirect address cache 66. The target address of each branch instruction is routed to forward collapse unit 68. According to one embodiment, branch scanner 58 is configured to scan each run section in parallel for the first two branch instructions and then to combine the scan results to select the first two branch instructions within the run.

Branch scanner 58 may further be configured to determine if a subroutine call instruction is scanned during a clock cycle. Branch scanner 58 may forward the fetch address of the instruction following the detected subroutine call instruction to return stack 64 for storage therein.

In one embodiment, if there are more than two branch instructions within a run, the run is scanned again during a subsequent clock cycle to identify the subsequent branch instruction.

The fetch addresses of the identified branch instructions are provided to branch history table 60 to determine a taken/not taken prediction for each instruction. Branch history table 60 comprises a plurality of taken/not-taken predictors corresponding to the previously detected behavior of branch instructions. One of the predictors is selected by maintaining a history of the most recent predictions and exclusive ORing those most recent predictions with a portion of the fetch addresses corresponding to the branch instructions. The least recent (oldest) prediction is exclusive ORed with the most significant bit within the portion of the fetch address, and so forth through the most recent prediction being exclusive ORed with the least significant bit within the portion of the fetch address. Since two predictors are selected per clock cycle, the predictor corresponding to the second branch instruction is dependent upon the prediction of the first branch instruction (for exclusive ORing with the least significant bit of the corresponding fetch address). Branch history table 60 provides the second predictor by selecting both of the predictors which might be selected (i.e. the predictor that would be selected if the first branch instruction is predicted not-taken and the predictor that would be selected if the first branch instruction is predicted taken) and then selecting one of the two predictors based on the actual prediction selected for the first branch instruction.

Branch history table 60 receives information regarding the execution of branch instructions from functional units 32A–32D. The history of recent predictions corresponding to the executed branch instruction as well as the fetch address of the executed branch instruction are provided for selecting a predictor to update, as well as the taken/not taken result of the executed branch instruction. Branch history table 60 selects the corresponding predictor and updates the predictor based on the taken/not taken result. In one embodiment, the branch history table stores a bimodal counter. The bimodal counter is a saturating counter which saturates at a minimum and maximum value (i.e. subsequent decrements of the minimum value and increments of the maximum value cause no change in the counter). Each time a branch instruction is taken, the corresponding counter is incremented and each time a branch instruction is not taken, the corresponding counter is decremented. The most significant bit of the counter indicates the taken/not taken prediction (e.g. taken if set, not taken if clear). In one embodiment, branch history table 60 stores 64K predictors and maintains a history of the 16 most recent predictions. Each clock cycle, the predictions selected during the clock cycle are shifted into the history and the oldest predictions are shifted out of the history.

Return stack 64 is used to store the return addresses corresponding to detected subroutine call instructions. Return stack 64 receives the fetch address of a subroutine call instruction from branch scanner 58. The address of the byte following the call instruction (calculated from the fetch address provided to return stack 64) is placed at the top of return stack 64. Return stack 64 provides the address stored at the top of the return stack to prefetch control unit 50 for selection as a target address if a return instruction is detected by branch scanner 58 and prefetch control unit 50. In this manner, each return instruction receives as a target address the address corresponding to the most recently detected call instruction. Generally in the x86 instruction set, a call instruction is a control transfer instruction which specifies that the sequential address to the call instruction be placed on the stack defined by the x86 architecture. A return instruction is an instruction which selects the target address from the top of the stack. Generally, call and return instructions are used to enter and exit subroutines within a code sequence (respectively). By placing addresses corresponding to call instructions in return stack 64 and using the address at the top of return stack 64 as the target address of return instructions, the target address of the return instruction may be correctly predicted. In one embodiment, return stack 64 may comprise 16 entries.

Indirect address cache 66 stores target addresses corresponding to previous executions of indirect branch instructions. The fetch address corresponding to an indirect branch instruction and the target address corresponding to execution of the indirect branch instruction are provided by functional units 32A–32D to indirect address cache 66. Indirect address cache 66 stores the target addresses indexed by the corresponding fetch addresses. Indirect address cache 66 receives the fetch address selected by branch select mux 62 (responsive to detection of an indirect branch instruction) and, if the fetch address is a hit in indirect address cache 66, provides the corresponding target address to prefetch control unit 50. In one embodiment, indirect address cache 66 may comprise 32 entries. According to one particular embodiment, if the fetch address is a hit in indirect address cache 66, no target address is provided from indirect address cache 66. Alternatively, one of the target addresses stored therein may be selected as a "guessed" target address, if desired.

According to one embodiment, prefetch control unit 50 selects the target address for fetching from L0 I-cache 16 from: (i) the first encoded target address corresponding to the first branch instruction identified by branch scanner 58; (ii) the return stack address provided by return stack 64; and (iii) a sequential address. Prefetch control unit 50 selects the first encoded target address if a decode of the opcode corresponding to the first instruction indicates that the instruction may be a relative branch instruction. If the decode indicates that the instruction may be a return instruction, then the return stack address is selected. Otherwise, the sequential address is selected. Indirect target addresses and 32 bit relative target addresses are prefetched from L1 I-cache 14. Since these types of target addresses are often used when the target address is not near the branch instruction within memory, these types of target addresses are less likely to hit in L0 I-cache 16. Additionally, if the second branch instruction is predicted taken and the first branch instruction is predicted not taken or the first branch instruction is a forward branch which does not eliminate the second branch instruction in the instruction run, the second target address corresponding to the second branch prediction may be used as the target fetch address during the succeeding clock cycle according to one embodiment.

It is noted that, if an encoded target address is selected, the actual target address may be presented to L0 I-cache 16. Prefetch control unit 50 may be configured to precalculate each of the possible above/below target addresses and select the correct address based on the encoded target address. Alternatively, prefetch control unit 50 may record which L0 I-cache storage locations are storing the above and below cache lines, and select the storage locations directly without a tag compare.

Forward collapse unit 68 receives the target addresses and positions within the instruction run of each selected branch instruction as well as the taken/not taken predictions. Forward collapse unit 68 determines which instructions within the run should be cancelled based upon the received predictions. If the first branch instruction is predicted taken and is backward (i.e. the displacement is negative), all instructions subsequent to the first branch instruction are cancelled.

If the first branch instruction is predicted taken and is forward but the displacement is small (e.g. within the instruction run), the instructions which are between the first branch instruction and the target address are cancelled. The second branch instruction, if still within the run according to the first branch instruction's prediction, is treated similarly. Cancel indications for the instructions within the run are set to instruction queue 20.

Prefetch control unit 50 may be further configured to select a cache line within L0 I-cache 16 for replacement by a cache line provided from L1 I-cache 14. In one embodiment, prefetch control unit 50 may use a least recently used (LRU) replacement algorithm.

Figure 3:
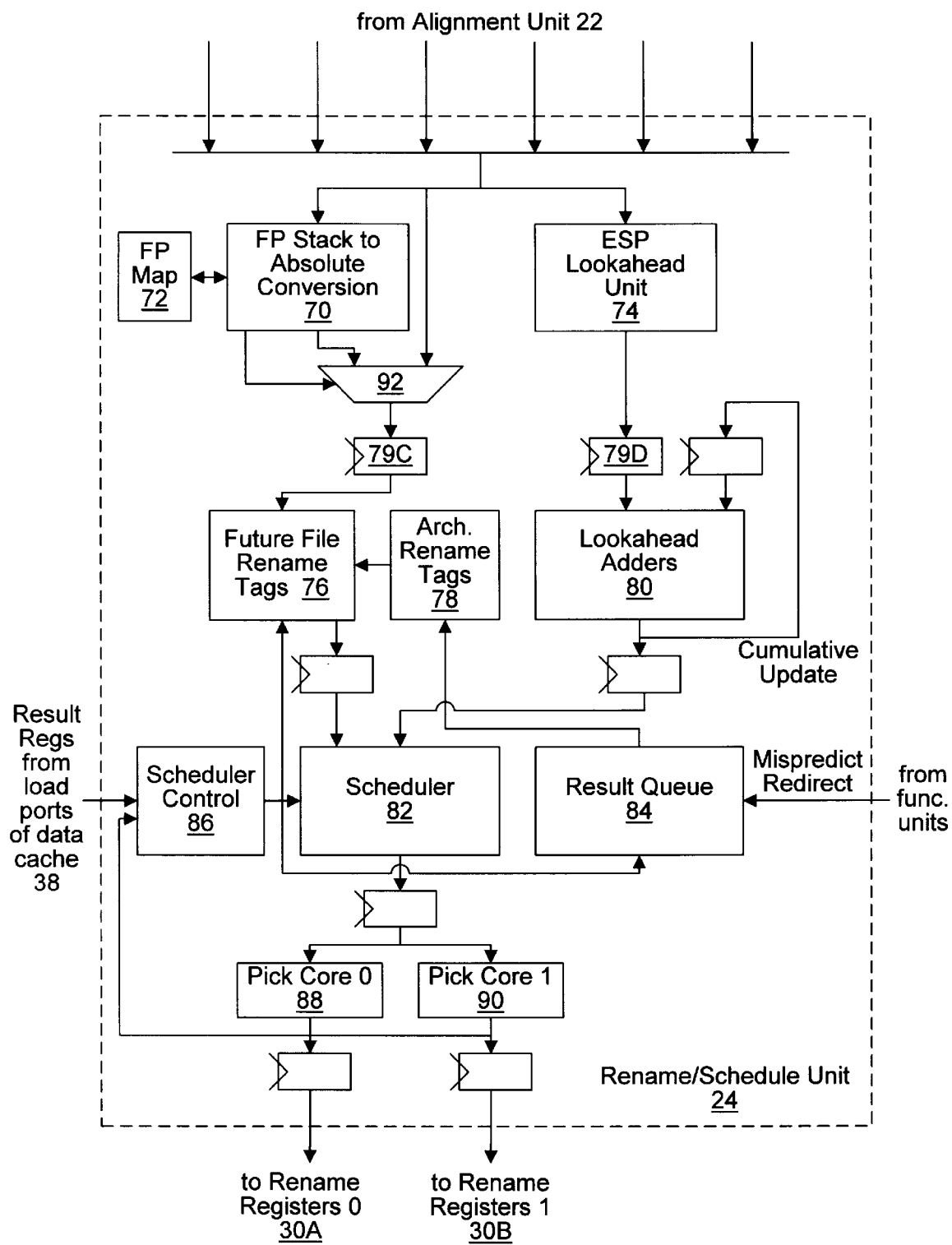
FIG. 3 is a block diagram of one embodiment of a rename/schedule unit shown in FIG. 2.

Turning next to FIG. 3, a block diagram of one embodiment of rename/schedule unit 24 is shown. Other embodiments are possible and contemplated. In the embodiment of FIG. 3, rename/schedule unit 24 includes an FP stack to absolute conversion unit 70, an FP map 72, an ESP lookahead unit 74, a future file rename tags unit 76, an architectural rename tags unit 78, a lookahead adders 80, a scheduler 82, a result queue 84, a scheduler control unit 86, a first pick core unit 88, and a second pick core unit 90. FP stack to absolute conversion unit 70 and ESP lookahead unit 74 are coupled to alignment unit 22. FP stack to absolute conversion unit 70 is coupled to FP Map 72 and to a multiplexor 92, which is further coupled to alignment unit 22 and to future file rename tags unit 76. ESP lookahead unit 74 is coupled to lookahead adders 80, which is further coupled to receive a cumulative ESP update and to scheduler 82. Lookahead adders 80 and future file rename tags unit 76 are coupled to scheduler 82. Future file rename tags unit 76 is further coupled to scheduler control unit 86 and to architectural rename tags unit 78. Architectural rename tags unit 78 is coupled to result queue 84, which is further coupled to schedule control unit 86. First and second pick core units 88 and 90 are coupled to scheduler 82 and to first and second rename register files 30A and 30B, respectively. It is noted that one or more decode units (not shown) may be coupled in parallel with FP stack to absolute conversion unit 70 and ESP lookahead unit 74, or serially before are after these units, to perform instruction decode operations.

As described above, alignment unit 22 aligns instructions to a set of issue positions within rename/schedule unit 24. The issue positions are maintained within scheduler 82 and result queue 84. Prior to storing the instructions into scheduler 82 and result queue 84, the instructions are presented to FP stack to absolute conversion unit 70 and ESP lookahead unit 74.

FP stack to absolute conversion unit 70 is provided for embodiments of processor 10 in which the floating point registers are operated as a stack (e.g. the x86 floating point architecture). One of the floating point registers is identified by a top of stack pointer in the floating point status register as the top of the stack, and other floating point registers are at positions within the stack according to their relative distance from the register identified by the top of stack. Some floating point instructions, in addition to or instead of specifying an operation upon one or more entries within the stack, may specify pushing a value onto or popping a value off of the stack. FP stack to absolute conversion unit 70 converts the stack relative register specifiers included in the floating point instructions to absolute register specifiers (i.e. register numbers which would address a floating point register file). FP stack to absolute conversion unit 70 maintains a speculative top of stack pointer corresponding to previously dispatched floating point instructions in order to perform the conversion. Additionally, FP stack to absolute conversion unit 70 determines the effect of each floating point instruction upon the top of stack pointer in order to convert the register specifiers for the next floating point instruction.

The x86 floating point architecture also specifies an exchange instruction which exchanges the values within two registers. FP stack to absolute conversion unit 70 may accelerate the exchange instruction (and instructions that follow), by swapping the absolute register specifiers corresponding to the two instructions instead of actually exchanging the values within the registers. FP map 72 is provided for this purpose. FP map 72 initially records the absolute register numbers in order from zero to N−1 (e.g. 0 to 7 in the x86 architecture). As exchange instructions are performed, the absolute register specifiers affected by the instructions are swapped within FP map 72. The absolute register number for a given floating point instruction may be determined by reading an entry in floating point map 72 as selected by the current speculative top of stack pointer and the position within the stack of the specified register (e.g. what would have been the absolute register specifier in the absence of exchange instructions).

The output of FP stack to absolute conversion unit 70 is provided to one input of multiplexor (mux) 92. The original register specifiers are provided to the other input of multiplexor 92. For each instruction, FP stack to absolute conversion unit 70 selects either its output or the original instruction, based upon whether or not that instruction is floating point. It is noted that, because exchange instructions may change the order of absolute register numbers, multimedia instructions have their register numbers (which are absolute) converted by FP stack to absolute conversion unit 70 as well in embodiments employing the x86 microprocessor architecture. It is further noted that the opcode and other instruction information (e.g. immediate fields and displacement fields) are passed unmodified through mux 82 and future file and rename tags unit 76 to be stored into scheduler 82.

ESP lookahead unit 74 is used, in combination with lookahead adders 80, to generate speculative values for the ESP register for each instruction which has the ESP as a source operand (for embodiments of processor 10 employing the x86 architecture). Because the x86 architecture specifies relatively few registers, many of which are not general purpose, many x86 instructions manipulate stack operands. The stack operands may be located using the ESP register as an address operand. Additionally, many instructions may modify the ESP register (e.g. pushing and popping values). Pushing and popping values results in an increment or decrement of the ESP register. Accordingly, many modifications to the ESP register may be generated ahead of time as a constant value to be added or subtracted from the ESP register.

ESP lookahead unit 74 scans the instructions provided within the set of issue positions to generate the constants that are added to the ESP register value existing prior to execution of the first instruction within the set of issue positions provided to ESP lookahead unit 74. These constants may be added to the speculative lookahead value of the ESP register (corresponding to the instructions previously dispatched by processor 10) to generate the ESP value for each instruction. In other words, the constant generated for the first issue position (in program order), includes the effects of the instruction in the first issue position (if the instruction modifies the ESP prior to using it as an address operand, e.g. a push). The constant generated for the second issue position includes the effects of the instruction in the first issue position and the effects of the instruction in the second issue position (if the instruction modifies the ESP prior to using it as an address operand, e.g. a push). Generally, the constant generated for issue position N includes the effects on the ESP of the instructions in the first issue position through issue position N-1, and the effects of the instruction in issue position N (if the instruction modifies the ESP prior to using it as an address operand, e.g. a push).

The constants generated by ESP lookahead unit 72 are provided to lookahead adders 80. Lookahead adders 80 maintain a cumulative ESP update value indicating the cumulative speculative update to the ESP register according to the instructions which have been speculatively dispatched since the last undeterminable update. Lookahead adders 80 add the constants received from ESP lookahead unit 74 to the cumulative ESP value maintained by lookahead adders 80 to generate lookahead ESP values for each instruction. Certain updates to the ESP may not be determinable by ESP lookahead unit 74 (e.g. moves from another register into ESP, add of a registered value to the ESP, etc.). If ESP lookahead unit 74 detects such a undeterminable update, ESP lookahead unit 74 may stall the instructions subsequent to the instruction performing the undeterminable update until that instruction executes. The update may be received by ESP adders 80 to allow for subsequent generation of speculative lookahead ESP values. According to one embodiment, the updates to the ESP of the following x86 instructions can be determined by ESP lookahead unit 74: CALL; RET 0,N; PUSH; POP; ADD ESP, IMM; ENTER 0, N; LEAVE 0, N; MOV EBP, ESP; and MOV ESP, EBP.

The register specifiers as selected by mux 92 are passed to future file rename tags unit 76 for renaming. Future file rename tags unit 76 provides the current rename tag to each source register, and assigns a new rename register from a list of free rename registers to each destination register. Future file rename tags unit 76 also resolves the dependencies between concurrently dispatched instructions. Finally, future file rename tags unit 76 updates its future file of rename tags to represent the newly assigned rename registers.

The instructions, including rename register tags and lookahead ESP values from lookahead adders 80, are provided to scheduler 82 for storage. In one embodiment, scheduler 82 is "line-oriented" in which a line of storage capable of storing instructions and associated information from each issue position is allocated, even if instructions do not fill each issue position. Additionally, storage is allocated in result queue 84 for storing the destination register rename tags.

Once the instructions are stored into scheduler 82, the instructions await validity of their source operands, at which time the instructions are eligible to be selected for execution ("scheduled"). Future file rename tags unit 76 maintains a validity indication for each rename register which is a current rename register (i.e. a register currently assigned to a particular architected register), so that instructions which have source operands which are already valid will indicate validity of those source operands upon storage into scheduler 82. Rename registers which are invalid indicate that the source operand is not yet valid (i.e. has not been updated in response to executing the instruction which updates the rename register) and therefore the instruction is not yet eligible for scheduling.

First and second pick core units 88 and 90 examine the instructions within scheduler 82 which are eligible for scheduling and schedule instructions to the corresponding first and second cores, respectively. The first core comprises the functional units and address generation units attached to rename register file 30A, and similarly the second core comprises the functional units and address generation units attached to rename register file 30B. The instructions selected by first and second pick core units 88 and 90 are provided to rename register files 30A and 30B for operand read, and are also provide to scheduler control unit 86.

Scheduler control unit 86 records the destination rename register for each scheduled instruction, and determines when the rename register is valid. Upon determining that the rename register is valid, the rename tag corresponding to the rename register is broadcast to the scheduler. Each source register rename tag which matches the broadcast tag is marked valid. For integer, floating point, and multimedia functional units according to the present embodiment, the number of clock cycles until the rename register is valid is a constant determined by the type of instruction and the instruction (e.g. multiplies may involve more clock cycles than adds, etc.). Memory operations, because they may involve cache misses and hence variable delays from scheduling to rename validity, are indicated as valid or not valid by data cache 38 to scheduler control unit 86. Scheduler control unit 86 may withhold validation of rename tags corresponding to memory operations until indicated valid by data cache 38.

Scheduler control unit 86 also broadcasts the validated register rename tags to future file rename tags unit 76 (so that future file rename tags unit 76 may indicate the rename tags as valid if they are still the current register renames within the future file) and to result queue 84 (so that result queue 84 may indicate that the corresponding instruction has been executed successfully).

Result queue 84 is provided to handle branch misprediction and other exception handling and in-order retirement of instructions. An instruction is retired by storing the rename tags identifying the rename registers assigned to the destination of the instruction into architectural rename tags unit 78. Result queue 84 may store the rename tag assigned to the destination register of the instruction, as well as the architected destination register number. In this manner, the rename tag may be associated with the corresponding architected register within architectural rename tags unit 78. The previous rename tag corresponding to that architected register may then be returned to the free list. Additionally, result queue 84 received misprediction redirection/exception information from the functional units to determine which instructions experienced an exception. Upon retiring an instruction which was mispredicted are experienced another type of exception, result queue 84 signals architectural rename tags 78 to copy its contents to future file rename tags unit 76. The future file of rename tags may thereby be recovered from the exception. It is noted that, if instructions are fetched from the corrected path and arrive at future file rename tags unit 76 prior to restoring the future file renames to the architectural renames, the instructions may be stalled until the exception causing instruction and prior instructions are retired and the future file tags are recovered. It is further noted that, upon retiring a move instruction for which the tags were swapped, the architected tags of the two registers involved in the move instruction may be swapped as well.

According to one embodiment, a line of instructions may be deallocated from scheduler 82 upon successful scheduling of all instructions within the line or invalidation of the line due to misprediction or exception. The line of instructions may be deallocated from result queue 84 upon selection for retirement or upon invalidation due to misprediction or exception.

It is noted that various storage devices are shown in FIGS. 2 and 3 (e.g. devices 79A, 79B, and similar devices in FIG. 2 and devices 79C, 79D and similar devices in FIG. 3). The storage devices represent latches, registers, flip-flops and the like which may be used to separate pipeline stages. However, the particular pipeline stages shown in FIGS. 2 and 3 are but one embodiment of suitable pipeline stages for one embodiment of processor 10. Other pipeline stages may be employed in other embodiments.

Figure 4:
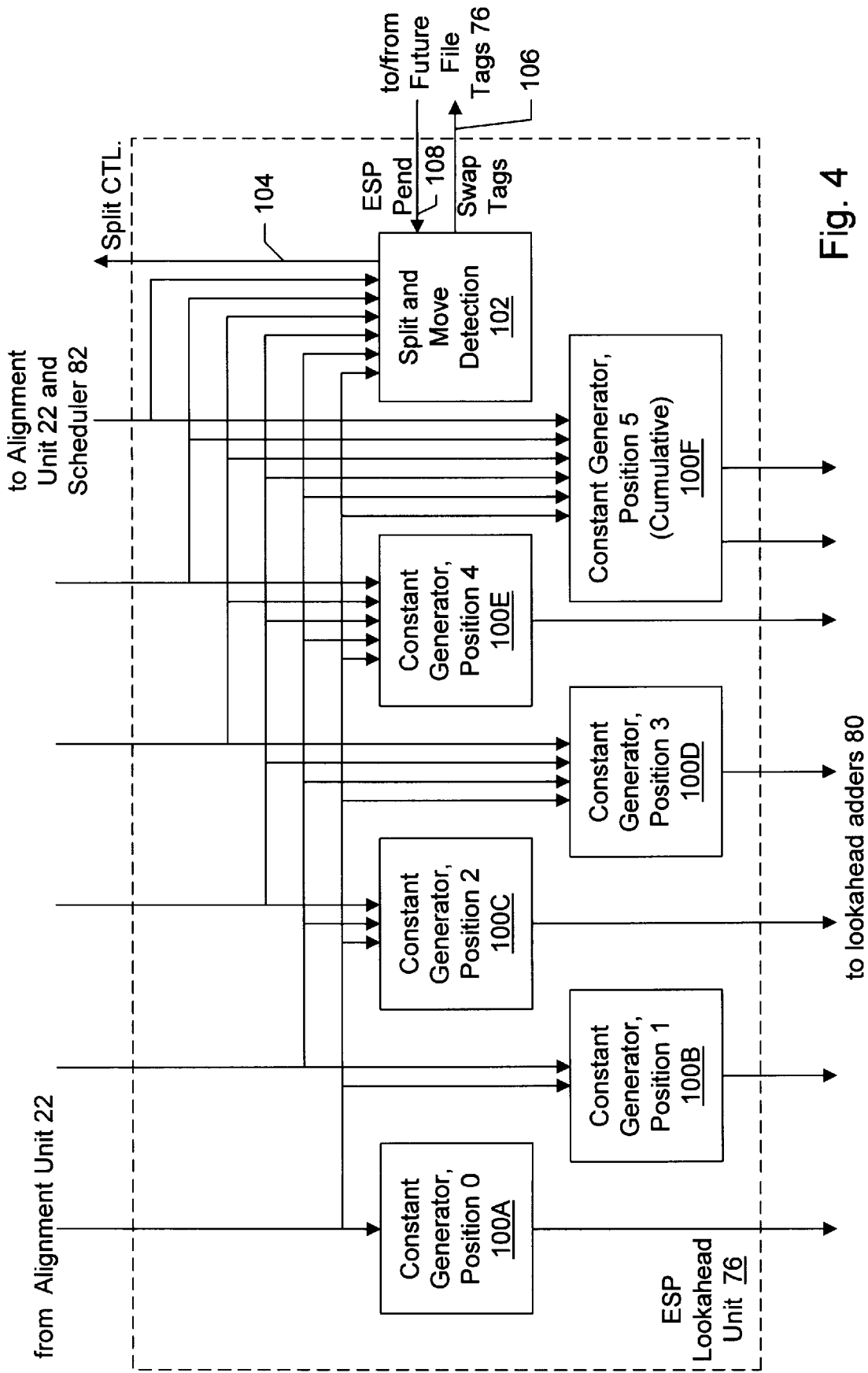
FIG. 4 is a block diagram of one embodiment of an ESP lookahead unit shown in FIG. 3.

Turning next to FIG. 4, a block diagram of one embodiment of ESP lookahead unit 74 is shown. Other embodiments are possible and contemplated. In the embodiment of FIG. 4, ESP lookahead unit 74 includes a plurality of constant generators 100A–100F and a split and move detection unit 102. Constant generators 100 are coupled to receive instructions from alignment unit 22, and to provide constants to lookahead adders 80. Additionally, split and move detection unit 102 is coupled to receive instructions from alignment unit 22. Split and move detection unit 102 provides split control information via split control bus 104, as well as a swap tags signal via swap tags line 106. Still further, split and move detection unit 102 is coupled to receive an ESP pending signal upon ESP pending line 108.

Split and move detection unit 102 scans the instructions provided by alignment unit 22 and is configured to detect move instructions from the base pointer register to the stack pointer register (and vice versa). Upon detecting such an instruction, split and move detection unit 102 asserts the swap tags signal upon swap tags line 106 to future file tags unit 76. Future file tags unit 76 is configured to swap the stack pointer and base pointer tags subsequent to assigning rename registers for the instructions being processed by ESP lookahead unit 74. Split and move detection unit 102 determines, from the state of the ESP pending line subsequent to the swapping of the tags, whether or not the new value of the stack pointer register is valid in rename register files 30. If the stack pointer is still pending (i.e. not valid), then split and move control unit 102 stalls subsequent instruction dispatch until the stack pointer register becomes valid. Once the stack pointer register becomes valid, lookahead adders 80 may read the new value of the stack pointer register for use with constants generated by constant generators 100.

In the present embodiment, split and move detection unit 102 is further configured to detect updates to the stack pointer register which are not determinable by constant generators 100. In one particular embodiment mentioned above, updates to the stack pointer register according to the following instructions are determinable: CALL; RET 0,N; PUSH; POP; ADD ESP, IMM; ENTER 0, N; LEAVE 0, N; MOV EBP, ESP; and MOV ESP, EBP. Other updates to the stack pointer register are detected by split and move detection unit 102. Upon detecting such an undeterminable update, split and move detection unit 102 splits the set of instructions provided by alignment unit 22 (the "line") at the undeterminable update. Instructions prior to and including the instruction having the undeterminable update are dispatched to lookahead adders 80 and future file rename tags unit 76, while the remaining instructions are stalled until the undeterminable update completes. When splitting a line, split and move detection unit 102 informs alignment unit 22, scheduler 82, and future file rename tags unit 76 via split control bus 104. The instruction at which the split is generated is provided, along with an asserted control signal indicating that the split is occurring.

Split and move detection unit 102 may split the line at the move base pointer to stack pointer instruction as well. While the instructions are being accelerated by swapping the tags in the tags future file, the current lookahead value maintained by lookahead adders 80 will be invalid upon dispatching the move base pointer to stack pointer instruction. Accordingly, the line is split and the subsequent instructions are stalled until the new stack pointer rename register becomes valid. The new stack pointer rename register may already be valid, in which case no stall occurs and the new value is read, or the stall may occur until the value becomes valid and can be read.

It is noted that, in the present embodiment, moves from the stack pointer register to the base pointer register may be detected and handled by swapping tags as well. However, since the stack pointer register is not actually modified by the instruction, the stack pointer lookahead value does not become invalid. Accordingly, the line may not be split in this case. For simplicity in the case in which a move from the base pointer to the stack pointer is also within the same line, however, the line may be split at the move from stack pointer to base pointer according to one embodiment.

Each constant generator 100A–100F corresponds to one of the issue positions into which instructions are aligned by alignment unit 22, and generates a constant indicating the cumulative update to the ESP of the instructions with the line which are prior to and including that issue position. Accordingly, constant generator 100A (which generates the constant for issue position 0) scans the instruction within issue position 0. Constant generator 100B scans the instructions within issue positions 0 and 1, etc. Constant generator 100F generates two constants. The first constant corresponds to the instruction within issue position 5, while the second constant indicates the cumulative update of the set of instructions. The first and second constants generated by constant generator 100F may differ in the case in which the instruction within issue position 5 uses the value of the ESP as a source, and then increments or decrements the value to store into the ESP register as a destination (e.g. POP). Alternatively, the cumulative constant may be generated separately (e.g. by split and move detection unit 102).

Figure 5:
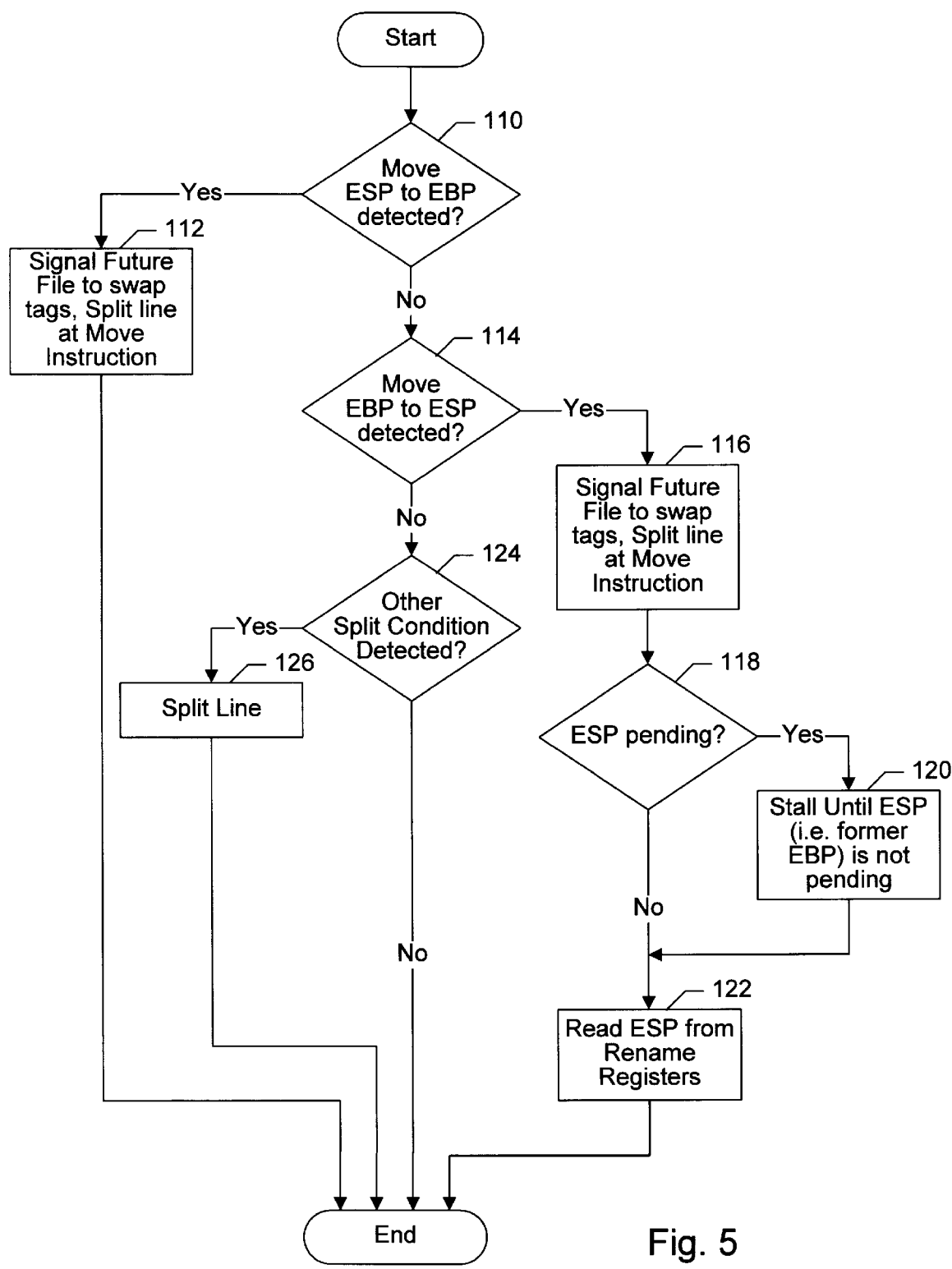
FIG. 5 is a flow chart illustrating operation of one embodiment of a split and move detection unit shown in FIG. 4.

Turning next to FIG. 5, a flowchart is shown illustrating operation of one embodiment of split and move detection unit 102 in scanning a set of instructions provided by alignment unit 22. Other embodiments are possible and contemplated. While the steps shown in FIG. 5 are illustrated in a serial order for ease of understanding, the steps may be performed in any suitable order. Furthermore, the steps may be performed in a variety of parallel fashions in combinatorial logic within split and move detection unit 102.

If split and move detection unit 102 detects a move from stack pointer to base pointer (decision block 110), split and move detection unit 102 signals future file rename tags unit 76 to swap the base pointer and stack pointer tags (step 112). Additionally, split and move detection unit 102 splits the line at the move instruction, and processing upon the line is complete for the present clock cycle. Instructions subsequent to the split are provided by alignment unit 22 again in a subsequent clock cycle.

Similarly, if split and move detection unit 102 detects a move from base pointer to stack pointer (decision block 114), split and move detection unit 102 signals future file rename tags unit 76 to swap the base pointer and stack pointer tags (step 116). Additionally, split and move detection unit 102 splits the line at the move instruction, and processing upon the line is complete for the present clock cycle. Instructions subsequent to the split may be provided by alignment unit 22 during a subsequent clock cycle. In addition, split and move detection unit 102 examines the ESP pending signal from future file rename tags unit 76 subsequent to the tag swap (e.g. in the succeeding clock cycle, in one particular embodiment). If the stack pointer tag is pending (decision block 118), split and move detection unit 102 stalls subsequent instructions until the stack pointer rename register (i.e. the former base pointer rename register) is valid (step 120). Subsequently, the new value of the stack pointer register may be read from rename register files 30 (step 122). Step 122 is included in the flowchart for clarity, although in the present embodiment step 122 may be performed by lookahead adders 80.

Split and move detection unit 102 may also detect a different split line condition (decision block 124). For example, other undeterminable updates to the ESP may be detected. Furthermore, any other limitations to instructions which may be concurrently dispatched may be detected in this fashion. Such limitations may be desirable if hardware within processor 10 can be simplified by employing the limitations. Upon detecting a different split line condition, split and move detection unit 102 splits the line at the identified instruction and processing upon the line is complete (step 126).

On the other hand, if none of the aforementioned conditions are detected, the line proceeds to the next pipeline stage and split and move detection unit 102 awaits the next line from alignment unit 22.

Figure 6:
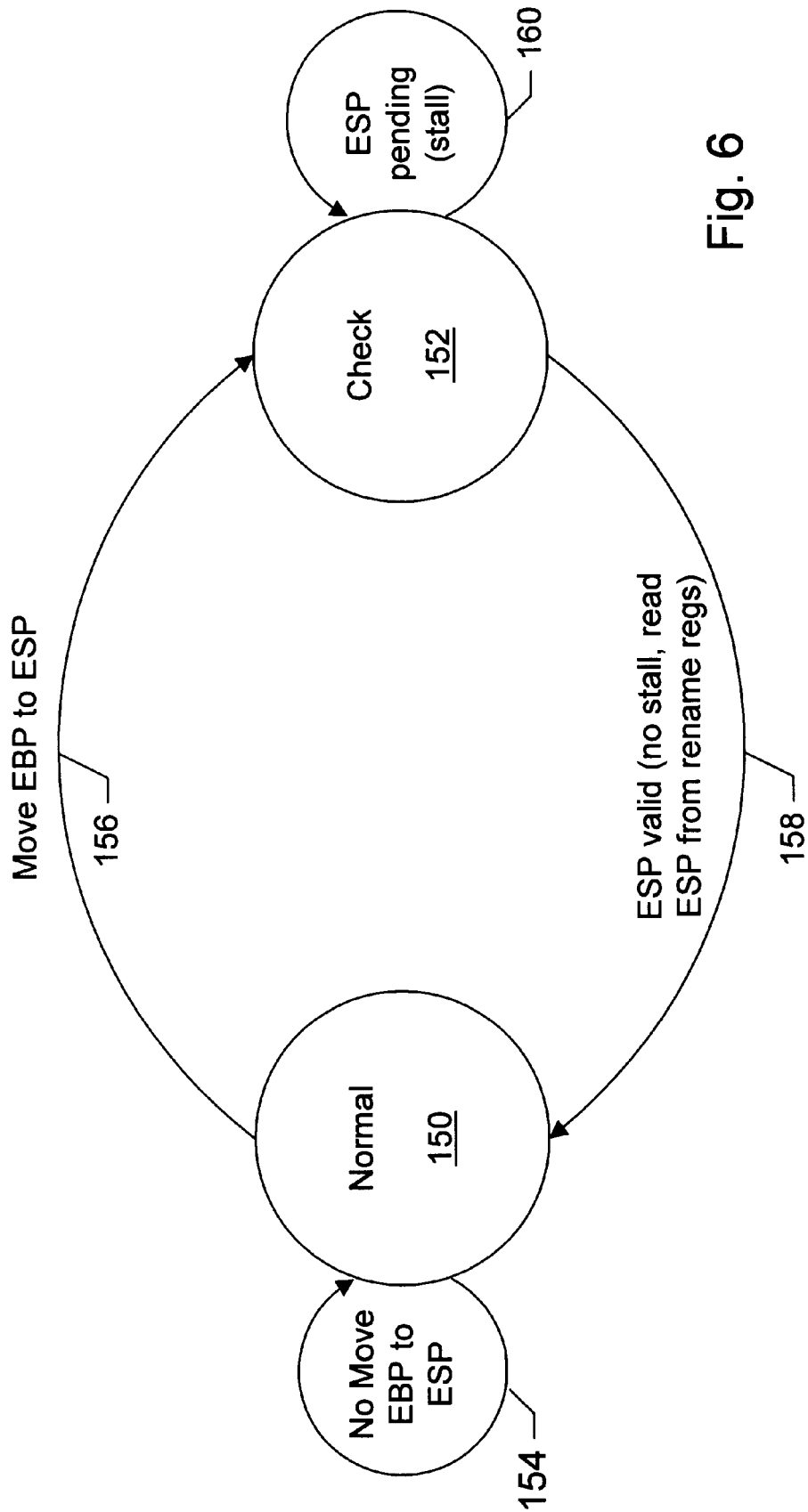
FIG. 6 is a state machine which may be employed by one embodiment of the split move and detection unit shown in FIG. 4.

Turning now to FIG. 6, an exemplary state machine which may be employed by one embodiment of split and move detection unit 102. Other embodiments are possible and contemplated. For example, other embodiments may employ different state machines, or none at all, depending upon the pipeline of the processor into which they are included. In the embodiment of FIG. 6, a normal state 150 and a check state 152 are providing.

Prior to detecting any split line conditions, split and move detection unit 102 is in normal state 150. In normal state 150, split and move detection unit 102 performs steps 110, 112, 114, 116, 124, and 126. If a move from base pointer to stack pointer is not detected, split and move detection unit 102 remains in state 150 (arc 154). On the other hand, if a move from base pointer to stack pointer is detected, split and move detection unit 102 transitions to state 152 (arc 156). Additionally, the stack pointer and base pointer rename tags are swapped.

In check state 152, split and move detection unit 102 performs steps 118 and 120 (upon getting an appropriate response from step 118). If the stack pointer register is pending subsequent to swapping the tags, split and move detection unit 102 remains in state 152 (arc 160). Additionally, subsequent instructions are stalled. If the stack pointer register is valid, split and move detection unit 102 transitions to normal state 150 (arc 158).

Figure 7:
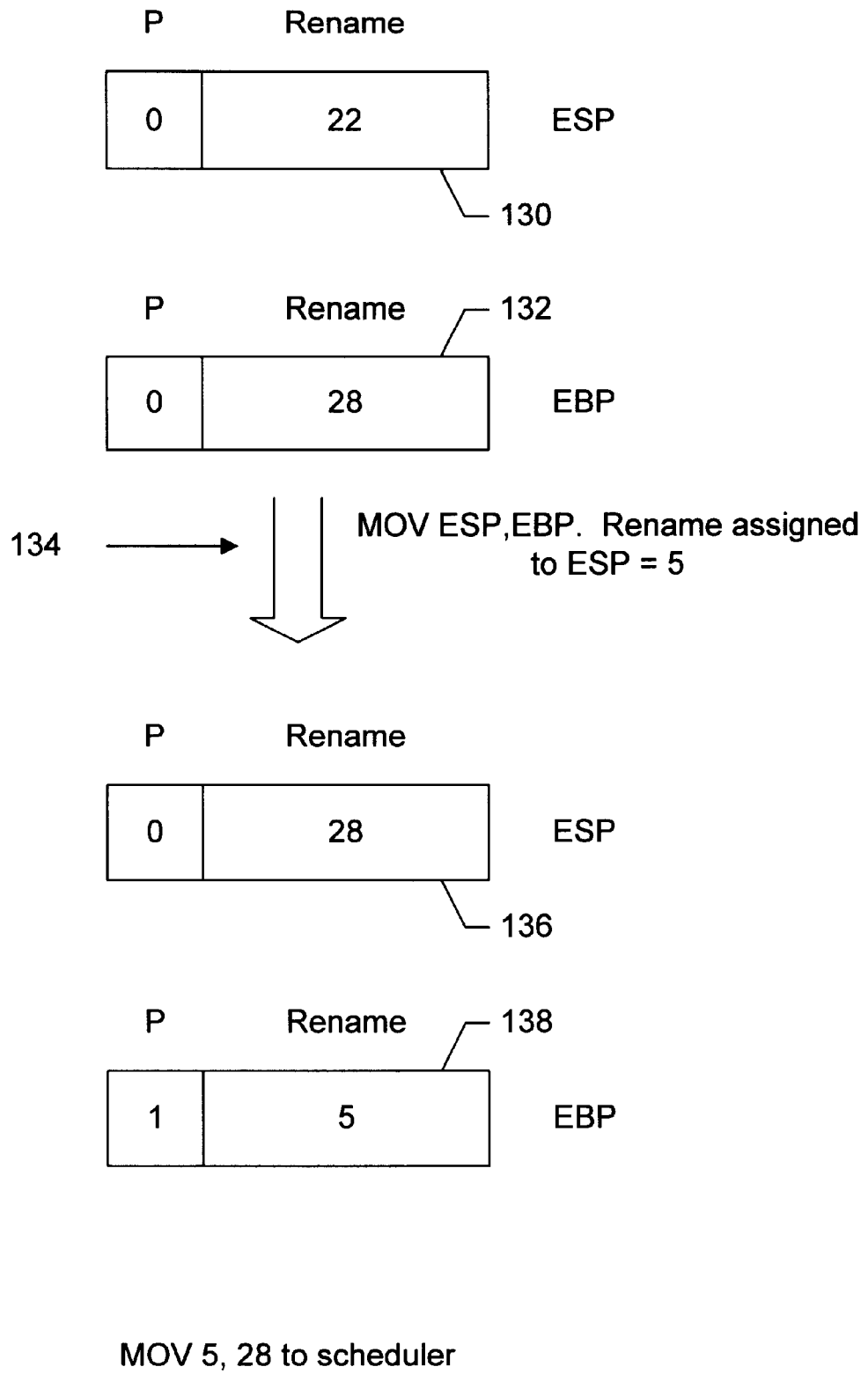
FIG. 7 is a first example of rename tag swapping.

Turning next to FIG. 7, an example illustrating the rename tags maintained by future file rename tags unit 76 and the swapping thereof upon detection of a move instruction is shown. An initial state of the rename tags corresponding to the stack pointer register (reference numeral 130) indicating rename register 22 and the base pointer register (reference numeral 132) indicating rename register 28 are shown. A move from base pointer to stack pointer instruction is then detected (reference numeral 134), and the rename register assigned to the destination register of the instruction is rename register 5.

Subsequent to dispatching the move instruction, the rename tag corresponding to the stack pointer (reference numeral 136) indicates rename register 28 (i.e. the rename register formerly assigned to the base pointer register). Additionally, the rename tag corresponding to the base pointer subsequent to dispatching the move instruction (reference numeral 138) indicates rename register 5.

The example of FIG. 7 also illustrates one of the advantages of the present tag swapping method for accelerating the generation of lookahead stack pointer values. Rename register 5 is pending (and will be until the move instruction executes), but rename register 28 is valid. Accordingly, the lookahead value corresponding to the stack pointer register can be quickly recovered by reading rename register 28 within rename register files 30.

Also illustrated in FIG. 7 is the move instruction conveyed to the scheduler in response to the MOV ESP, EBP instruction. The instruction is MOV 5, 28 (i.e. move the value in rename register 28 to rename register 5). Accordingly, upon executing the move instruction, the rename register assigned to the base pointer register will be updated and the pending indication will be reset.

Figure 8:
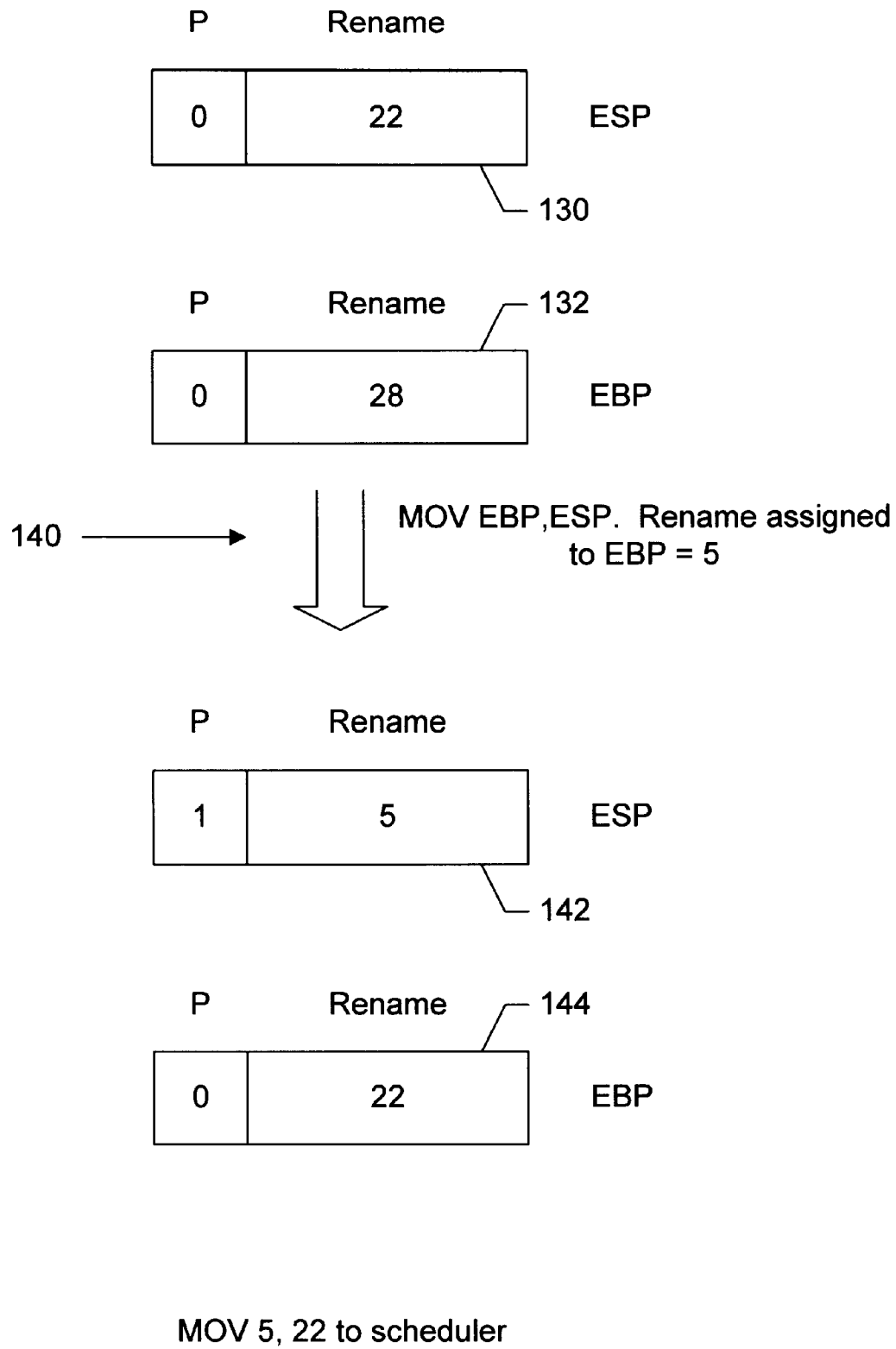
FIG. 8 is a second example of rename tag swapping.

Turning next to FIG. 8, another example illustrating the rename tags maintained by future file rename tags unit 76 and the swapping thereof upon detection of a move instruction is shown. An initial state of the rename tags corresponding to the stack pointer register (reference numeral 130) indicating rename register 22 and the base pointer register (reference numeral 132) indicating rename register 28 are shown. A move from stack pointer to base pointer instruction is then detected (reference numeral 140), and the rename register assigned to the destination register of the instruction is rename register 5.

Subsequent to dispatching the move instruction, the rename tag corresponding to the base pointer (reference numeral 144) indicates rename register 22 (i.e. the rename register formerly assigned to the stack pointer register). Additionally, the rename tag corresponding to the stack pointer subsequent to dispatching the move instruction (reference numeral 142) indicates rename register 5.

While the example shown in FIG. 8 indicates that the stack pointer register is now pending, it is noted that the lookahead copy of the stack pointer register remains valid. Accordingly, instruction dispatch and lookahead copies of the stack pointer register may continue to be generated. In other words, split and move detection unit 102 may ignore the ESP pending signal upon performing a tag swap for a move from stack pointer to base pointer instruction.

Also illustrated in FIG. 8 is the move instruction conveyed to the scheduler in response to the MOV EBP, ESP instruction. The instruction is MOV 5, 22 (i.e. move the value in rename register 22 to rename register 5). Accordingly, upon executing the move instruction, the rename register assigned to the stack pointer register will be updated and the pending indication will be reset.

It is noted that, while the examples of FIGS. 7 and 8 show one rename tag for the base pointer register and stack pointer register, multiple tags may be employed for each register in embodiments in which portions of the register may be updated while other portions remain constant (e.g. ESP and SP or EBP and BP in the x86 microprocessor architecture).

Figure 9:
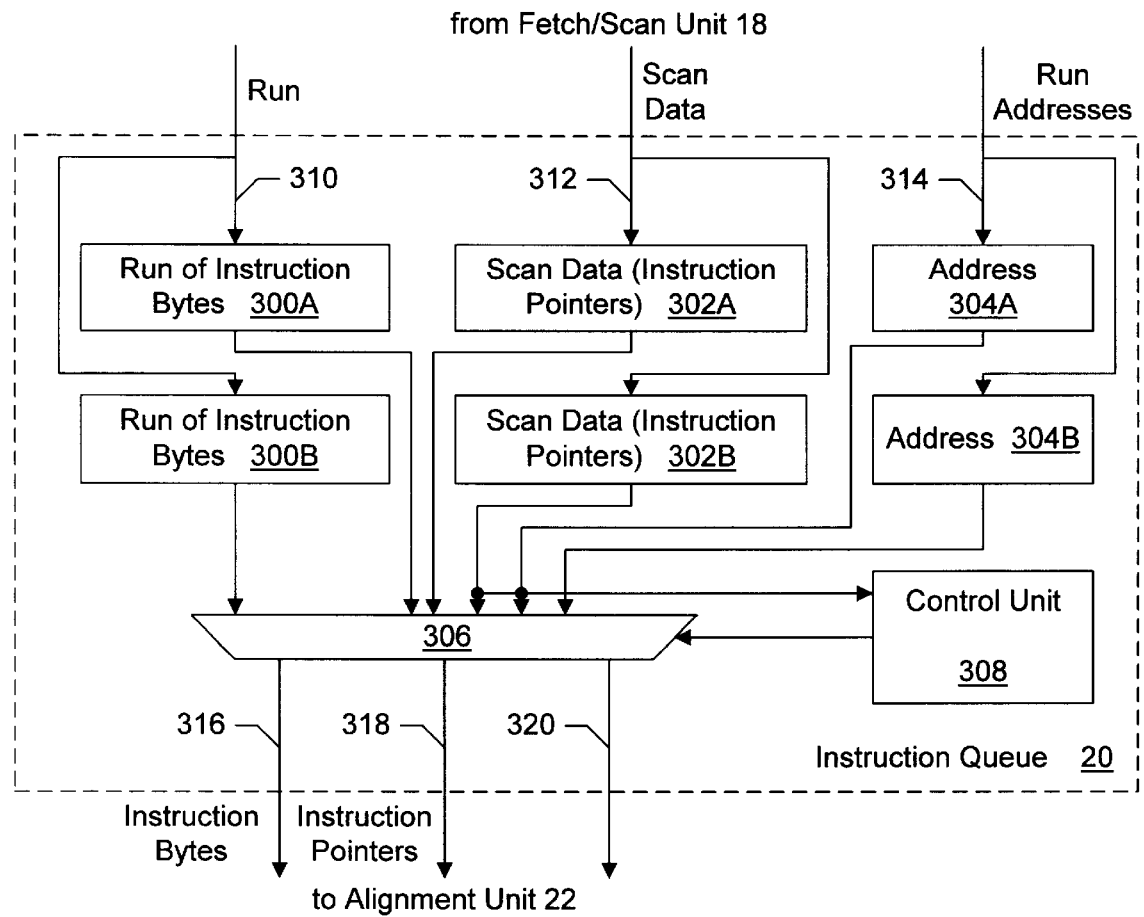
FIG. 9 is a block diagram of one embodiment of an instruction queue illustrated in FIG. 1.
Figure 10:
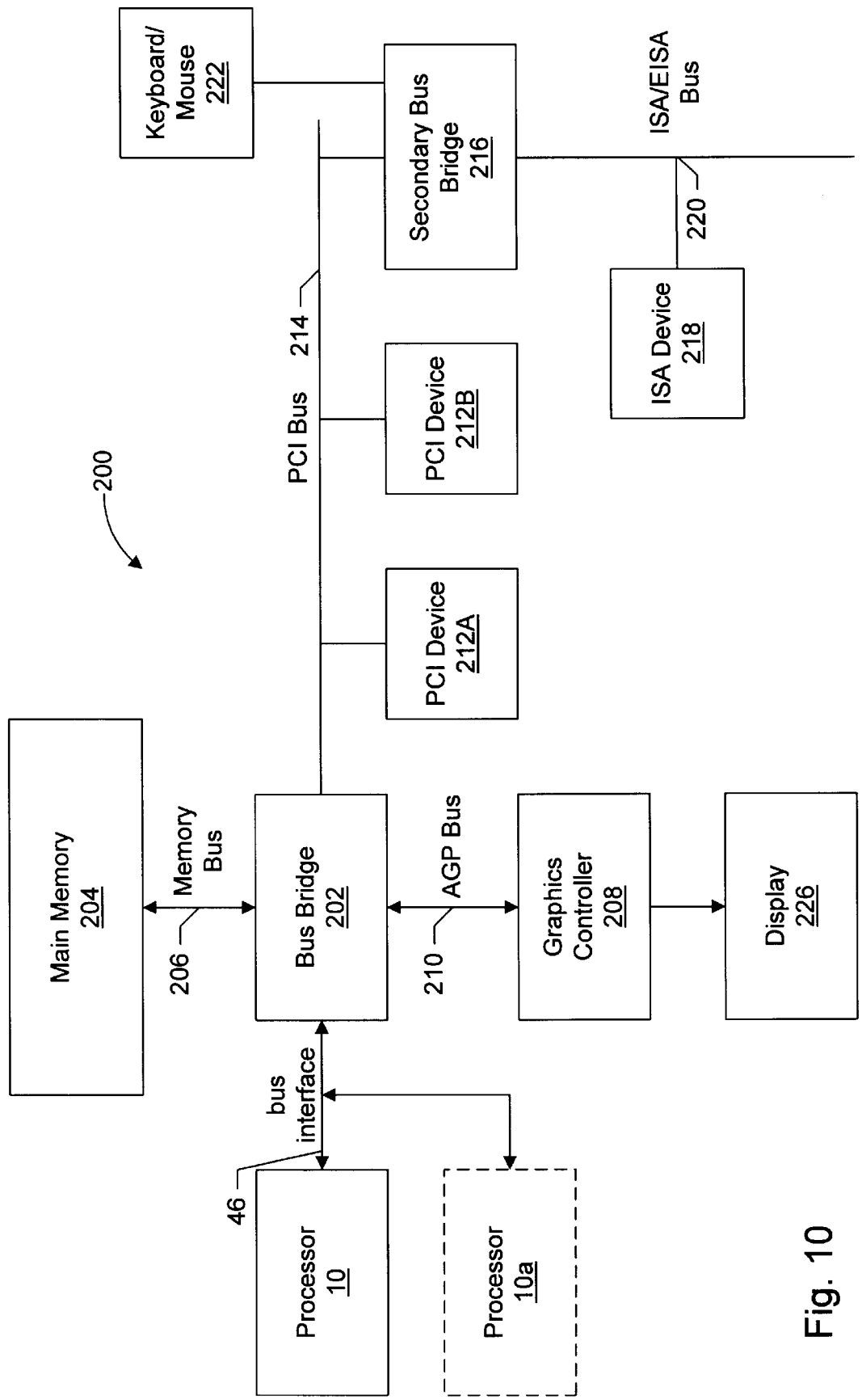
FIG. 10 is a block diagram of one embodiment of a computer system including the processor shown in FIG. 1.

Turning next to FIG. 9, a block diagram of one exemplary embodiment of instruction queue 20 is shown. Other embodiments are possible and contemplated. In the embodiment of FIG. 9, instruction queue 20 includes run storages 300A–300B, scan data storages 302A–302B, and address storages 304A–304B. Additionally, instruction queue 20 includes a mux 306 and a control unit 308. A run of instructions is provided to instruction queue 20 from fetch/scan unit 18 via a run bus 310; corresponding scan data is provided on a scan data bus 312; and corresponding addresses (one per run section) are provided on a run addresses bus 314. Instruction queue 20 provides a set of selected instruction bytes to alignment unit 22 on instruction bytes bus 316, pointers to instructions within the instruction bytes on an instruction pointers bus 318, and addresses for the run sections comprising the set of selected instruction bytes on an addresses bus 320. Run bus 310 is coupled to run storages 300A–300B, while scan data bus 312 is coupled to scan data storages 302A–302B and address storages 304A–304B are coupled to run addresses bus 314. Storages 300A–300B, 302A–302B, and 304A–304B are coupled to mux 306, which is further coupled to buses 316–320. Control unit 308 is coupled to mux 306 and scan data storages 302A–302B.

Fetch/scan unit 18, and more particularly instruction scanner 56 according to the embodiment of FIG. 2, provides a run of instructions and associated information to instruction queue 20 via buses 310–314. Control unit 308 allocates one of run storages 300A–300B for the instruction bytes comprising the instruction run, and a corresponding scan data storage 302A–302B and address storage 304A–304B for the associated information. The scan data includes instruction pointers which identify: (i) the start byte and end byte as offsets within a run section; as well as (ii) the run section within which the instruction resides. According to one particular embodiment, up to five instructions may be identified within an eight byte run section, and there are up to three run sections in a run for a total of up to 15 instructions pointers stored within a scan data storage 302. Additionally, address storages 304 store an address corresponding to each run section.

Control unit 308 examines the instructions pointers within scan data storages 302A–302B to identify instructions within a set of contiguous run sections for dispatch to alignment unit 22. In one particular embodiment, up to six instructions are identified within up to four contiguous run sections. The run sections may be stored in one of run storages 300A or 300B, or some run sections may be selected from one of run storages 300A–300B and the other run sections may be selected from the other one of run storages 300A–300B. A first run section is contiguous to a second run section if the first run section is next, in speculative program order, to the second run section. It is noted that mux 306, while illustrated as a single mux in FIG. 13 for simplicity in the drawing, may be implemented by any suitable parallel or cascaded set of multiplexors.

Control unit 308 provides a set of selection signals to mux 306 to select the set of run sections including the selected instructions, as well as the instruction pointers corresponding to the selected instructions. Additionally, the address for each selected run section is selected. The run sections are provided upon instruction bytes bus 316, while the corresponding instruction pointers and addresses are provided upon instruction pointers bus 318 and addresses bus 320, respectively.

Turning now to FIG. 9, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 9) or may be connected to bus bridge 202 via an independent bus.

It is noted that, while in portions of the above disclosure the stack pointer register may be referred to as the ESP register and the base pointer register may be referred to as the EBP register as defined in the x86 instruction set architecture, the present invention is not limited to this architecture. For example, while other architectures may not include an explicit stack pointer and/or base pointer register, software may be designed to use a particular general purpose register as a stack pointer register. Similarly, another general purpose register may be used by software as a base pointer register. Embodiments of a processor employing other instruction set architectures and software designed in the above fashion may achieve benefits according to the present invention. Furthermore, while the present embodiment detects moves between the stack pointer and base pointer registers to perform rename tag swapping, moves between any two registers may be detected in various contemplated embodiments and rename tag swapping may be performed in response thereto.

In accordance with the above disclosure, a processor has been disclosed which accelerates move instructions by swapping the rename tags corresponding to the source and destination registers within a rename tags control unit. In cases in which the destination of the move is a source for subsequent instructions, the subsequent instructions may be accelerated. Performance of the processor may thereby be increased. In one particular embodiment, moves from the base pointer register to the stack pointer register (and vice versa) are accelerated. The processor attempts to generate lookahead values for the stack pointer, and acceleration of the move to the stack pointer may aid in generating the lookahead values more rapidly.

Numerous variations and modifications will become apparent to those skilled in the art once the above disclosure is fully appreciated. It is intended that the following claims be interpreted to embrace all such variations and modifications.

What is claimed is:

1. An apparatus for performing register renaming comprising:
    a lookahead unit configured to scan instructions prior to an assignment of register renames to said instructions to detect a move instruction having a first architected register as a source register and a second architected register as a destination register; and
    a rename tags unit coupled to said lookahead unit, wherein said rename tags unit is configured to store a plurality of rename tags including a first rename tag corresponding to said first architected register and a second rename tag corresponding to said second architected register, wherein said first rename tag identifies a first rename register assigned to said first architected register and said second rename tag identifies a second rename register assigned to said second architected register;
    wherein said lookahead unit is configured to signal said rename tags unit upon detecting said move, and wherein said rename tags unit is configured to assign said first rename register to said second architected register responsive to said signal.

2. The apparatus as recited in claim 1 wherein said rename tags unit is further configured to assign a third rename register responsive to said move instruction, wherein a third rename tag identifies said third rename register, and wherein said third rename register is used by said move instruction as a destination register upon execution of said move instruction.

3. The apparatus as recited in claim 2 wherein said rename tags unit is further configured to assign said third rename register to said first architected register.

4. The apparatus as recited in claim 3 wherein said rename tags unit is configured to assign said first rename register to said second architected register and said third rename register to said first architected register subsequent to mapping operands for said move instruction, whereby said move instruction receives said first rename tag as a source operand identifier and said third rename tag as a destination identifier.

5. The apparatus as recited in claim 2 further comprising a rename registers file comprising said first rename register, said second rename register, and said third rename register.

6. The apparatus as recited in claim 5 wherein said lookahead unit is configured to stall instructions subsequent to said move instruction if a value within said first rename register is pending.

7. The apparatus as recited in claim 5 further comprising a lookahead storage corresponding to said second architected register, and wherein said apparatus is configured to update said lookahead storage with a value from said first rename register if said first rename register is valid.

8. The apparatus as recited in claim 7 wherein said apparatus is configured to use said value to generate lookahead values for said instructions subsequent to said move instruction.

9. A method for performing register renaming comprising:
    assigning a first rename register to a first architected register responsive to dispatching a first instruction having said first architected register as a destination;
    assigning a second rename register to a second architected register responsive to dispatching a second instruction having said second architected register as a destination;
    detecting a move instruction defined to move a value from said first architected register to said second architected register; and
    assigning said first rename register to said second architected register responsive to said detecting.

10. The method as recited in claim 9 further comprising assigning a third rename register for a destination of said move instruction responsive to said detecting.

11. The method as recited in claim 10 further comprising assigning said third rename register to said first architected register responsive to said detecting.

12. The method as recited in claim 11 further comprising scheduling said move instruction for execution.

13. The method as recited in claim 12 further comprising reading said first rename register responsive to said scheduling.

14. The method as recited in claim 13 further comprising executing said move instruction and updating said third rename register responsive to said executing.

15. The method as recited in claim 9 further comprising reading said first rename register to provide a value corresponding to said second architected register responsive to said assigning said first rename register to said second architected register.

16. The method as recited in claim 15 further comprising stalling instructions subsequent to said move instruction if said first rename register has not been updated responsive to executing said first instruction.

17. A processor comprising:
- a rename/schedule unit coupled to receive instructions fetched by said processor, wherein said rename/schedule unit is configured to perform register renaming responsive to receiving said instructions and to schedule said instructions for execution; and
- a rename register file coupled to said rename/schedule unit, wherein said rename register file comprises a plurality of rename registers;

wherein said rename/schedule unit is configured to maintain a mapping between each architected register and at least one of said plurality of rename registers, and wherein said rename/schedule unit, upon detecting a move instruction having a first architected register as a source operand and a second architected register as a destination, is configured to reassign one of said plurality of rename registers assigned to said first architected register to said second architected register.

18. The processor as recited in claim 17 wherein said rename/schedule unit is further configured to assign another one of said plurality of rename registers to said destination of said move instruction.

19. The processor as recited in claim 18 wherein said rename/schedule unit is further configured to update said mapping to assign said another one of said plurality of rename registers to said first architected register.

20. The processor as recited in claim 18 wherein said rename/schedule unit is further configured to schedule said move instruction for execution.

21. The processor as recited in claim 20 wherein said rename register file is configured to provide a value within said one of said plurality of rename registers responsive to said rename/scheduling unit scheduling said move instruction.

22. The processor as recited in claim 21 further comprising an execution unit coupled to said rename register file, wherein said execution unit is configured to execute said move instruction, and wherein said execution unit is configured to provide said value upon executing said move instruction to said rename register file, and wherein said execution unit is further configured to identify said another one of said plurality of rename registers as said destination, whereby said another one of said plurality or rename registers is updated with said value.

* * * * *